(12) United States Patent
Reynolds et al.

(10) Patent No.: US 6,718,296 B1
(45) Date of Patent: Apr. 6, 2004

(54) MEASUREMENT OF SIGNAL QUALITY

(75) Inventors: Richard J B Reynolds, Ipswich (GB); Antony W Rix, Cambridge (GB); Michael P Hollier, Woodbridge (GB); Gray Philip, Ipswich (GB); Eleanor J Beamond, Lymington (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/786,885

(22) PCT Filed: Sep. 29, 1999

(86) PCT No.: PCT/GB99/03236

§ 371 (c)(1),
(2), (4) Date: Mar. 9, 2001

(87) PCT Pub. No.: WO00/22803

PCT Pub. Date: Apr. 20, 2000

(30) Foreign Application Priority Data

Oct. 8, 1998 (EP) .............................. 98308195

(51) Int. Cl.$^7$ ................. G10L 19/00; H04Q 7/20
(52) U.S. Cl. .................. 704/200.1; 704/230; 455/423; 455/67.12; 375/224
(58) Field of Search ............... 704/230, 200.1; 455/423; 375/224

(56) References Cited

U.S. PATENT DOCUMENTS

| | | | | |
|---|---|---|---|---|
| 4,914,703 A | * | 4/1990 | Gillick ................ | 704/239 |
| 5,596,364 A | * | 1/1997 | Wolf et al. .......... | 348/192 |
| 6,275,797 B1 | * | 8/2001 | Randic ................ | 704/231 |
| 6,330,428 B1 | * | 12/2001 | Lewis et al. ........ | 455/423 |
| 6,512,746 B1 | * | 1/2003 | Sand .................. | 370/252 |

OTHER PUBLICATIONS

Rabiner et al., "Fundamentals of Speech Recognition," Prentice Hall, 1993, pp. 200–238.*

ITU–T P.861 "Objective quality measurement of telephone band (300–3400 Hz) speech codecs," Feb. 1998.*

* cited by examiner

Primary Examiner—Richemond Dorvil
Assistant Examiner—V. Paul Harper
(74) Attorney, Agent, or Firm—Nixon & Vanderhye P.C.

(57) ABSTRACT

Apparatus for assessing the performance of telecommunications systems by comparison of a reference signal with the same signal as degraded by the system under test tends to give unreliable results when used to test connectionless packet-switching equipment. This is because variable delay in delivery of the individual packets can result in the test signal and reference signal becoming unsynchronised. This may lead to the apparatus recording a poorer performance than a human tester would have recorded. To overcome this problem, the invention separates the test signal into a series of individual sections, which are synchgronised and analysed separately, and a quality value, aggregated over all the sections, is derived.

24 Claims, 8 Drawing Sheets

MEASUREMENT OF SIGNAL QUALITY

This invention relates to the measurement of quality of a sound signal, and more specifically a speech signal. Objective processes for this purpose are currently under development and are of application in prototype testing, pre-delivery testing of components, and in-service testing of installed equipment. They are most commonly used in telephony, but are also of application in other systems used for carrying speech signals, for example public-address systems.

The present applicant has a number of patents and applications relating to this technical field, most particularly European Patent 0647375, granted on Oct. $14^{th}$ 1998. In this system, a signal degraded by the system under test is compared with a reference signal, which has not passed through the system under test, to identify audible errors in the degraded signal. These audible errors are assessed to determine their perceptual significance—that is, errors of types which are considered significant by human listeners are given greater weight than are those which are not considered so significant. Since only audible errors are assessed, inaudible errors, which are perceptually irrelevant, are not assessed.

The automated system provides an output comparable to subjective quality measures originally devised for use by human subjects. More specifically, it generates two values, $Y_{LE}$ and $Y_{LQ}$, equivalent to the "Mean Opinion Scores" (MOS) for "listening effort" and "listening quality", which would be given by a panel of human listeners when listening to the same signal, as will be discussed later. The use of an automated system allows for more consistent assessment than human assessors could achieve, and also allows the use of compressed and simplified test sequences, and multilingual test sequences, which give spurious results when used with human assessors because such sequences do not convey intelligible content.

Such automated systems require a known (reference) signal to be played through a distorting system (the telephone network) to derive a degraded signal, which is compared with an undistorted version of the reference signal. Such systems are known as "intrusive" measurement systems, because whilst the test is carried out the system under test cannot carry live (revenue-earning) traffic.

An auditory transform of each signal is taken, to emulate the response of the human auditory system (ear and brain) to sound. The degraded signal is then compared with the reference signal in the perceptual domain, in which the subjective quality that would be perceived by a listener using the network is determined from parameters extracted from the transforms.

A suitable test signal is disclosed in International Patent Specification WO/95/01011 (EP0705501) and comprises a sequence of speech-like sounds, selected to be representative of the different types of phonetic sounds that the system under test may have to handle, presented in a sequence. The sounds are selected such that typical transitions between individual phonetic elements are represented. Typical speech comprises a sequence of utterances separated by silent periods, as the speaker pauses to breathe, or listens to the other party to the conversation. These silent periods, and the transitions between utterances and silent periods, are also modelled by the test signal.

This existing system reliably assesses most speech carrier technologies employed within conventional analogue and digital switched telephone networks. In such networks a dedicated connection is provided between the two parties to a call, for the duration of that call, and all speech is carried over that connection. However, connectionless packet-based speech transmission systems are beginning to be introduced, in particular for use in the "Internet" and companies' internal "Intranets". In a connectionless packet-based system each transmission is divided into a series of data "packets", which travel independently from one user to the other. Intermediate nodes in the network transmit the packets to each other according to address information carried in each packet. However, according to the demands of other traffic on the various links between such nodes, and the available capacity on those links, different packets may be delayed, or may travel by different routes to reach the same destination. Consequently, end-to-end times vary from one packet to another. For the transmission of data such as text, or downloading of computer files for the recipient to use subsequently, such variations in end-to-end times are of little consequence. However, when used for real-time speech, these variations can affect the clarity of the speech as perceived by the user.

Various proposals have been made to try to minimise the delay to a level which does not interfere with conversation and comprehension—see for example the present applicant's International Patent Application WO99/12329, and the article by R Barnett in "*Electronics and Communication Engineering Journal*", October 1997, entitled "*Connectionless ATM*". However, it is fundamental to such connectionless systems that some variation in the residual delay will occur. A single speech utterance is typically assembled from the information carried in several packets. However, variations in the delay between individual packets will in general not be apparent in the resulting utterance, as the slowest packet generally determines the delay to the utterance as a whole. However, the delay to each complete utterance can vary considerably between one utterance and the next, as buffer lengths are normally adjusted during periods of silence.

Changes to the delay occurring during the course of an utterance, for example because part of the utterance is missing, will be more apparent in the resulting utterance.

In addition to changes in residual delay, transmission systems are now beginning to come into use in which changes in other characteristics, such as level (signal amplitude), can occur. See ITU-T draft recommendation G. 169.

The human brain is insensitive to small changes in delay and amplitude between speech events, so these variations may be imperceptible to a human listener, provided the magnitude of the effect is not such as to interfere with conversation. However, the prior art measuring system is sensitive to such variations, so that it returns unreliable values for signal quality when testing connectionless packet systems—that is, the results do not accurately reflect the subjective quality reported by human subjects.

If the delay is constant, the two signals can easily be synchronised to take account of the delay. However, if the degraded signal suffers variable delay, at least some parts of the degraded signal would not be synchronised with the test signal. The lack of synchronisation in those parts would be detected as substantial errors, which would be so great as to mask any errors caused by actual degradation of the signal. This would lead to an inaccurate measure of the subjective effect of the degradation.

There is therefore a requirement for a measurement system that is robust against such variable delays.

According to the invention, there is provided apparatus for testing equipment for handling speech signals, comprising means for receiving first and second signals, means for selecting individual sections in the first signal and second signal, means for comparing each section in the second signal with the corresponding section in the first signal to generate a distortion perception measure which indicates the extent to which the distortion of said section would be perceptible to a human listener, and means for combining the results of each such measurement to generate an overall measure of the extent to which the distortion of the second signal with respect to the first signal would be perceptible to a human listener.

Preferably, the overall measure takes account of the perceptual importance of each section. The perceptual importance of a given section will depend on the number of individual speech components, and their relative importance to subjective quality measures, in that section.

The means for selecting individual sections in the two signals may comprise means for identifying individual utterances. In the preferred embodiment this is achieved by detecting the end of each silent period in the signal. The apparatus preferably includes means for synchronising each section in the distorted signal with the corresponding section in the test signal. Synchronisation is preferably carried out by analysis of the speech content of the signals. However, a separate synchronisation characteristic may be used to identify the onset of each section. This synchronisation characteristic is preferably outside the frequency band characteristic of speech, so that it does not interfere with the analysis process (which only detects changes perceptible to a human listener). The synchronisation characteristic related to a given section may be chosen to be unique to that section, to ensure that each distorted section is compared with the corresponding test section. This ensures that, should a section, or its synchronisation characteristic, be lost as a result of the distortion, subsequent sections can nevertheless be analysed.

In a preferred arrangement, each section is analysed to identify the position of any delay change, and the parts of the section preceding and following any such delay change are separately synchronised, and analysed for degradation.

In the embodiment to be described in detail, the sections which are selected for analysis may comprise individual utterances, that is unbroken sections of speech each preceded and followed by silence of a minimum pre-determined length. However, a number of alternative methods may be used for defining suitable sections. For example, long utterances as previously defined may be sub-divided into two or more sub-utterances. The signal may instead be broken into a number of sections of fixed length or a fixed number of equal-length sections. However, if any sections contain no speech at all, they are preferably not used for analysis as delay is harder to determine. Any errors in non-information containing sections are less likely to be perceptually important.

In another aspect, the invention comprises a method of testing equipment for handling speech signals, comprising the steps of supplying a test signal, receiving a distorted signal which corresponds to said test signal when distorted by equipment under test, selecting individual sections in the test signal and distorted signal, comparing each section in the distorted signal with the corresponding section in the test signal to generate a distortion perception measure which indicates the extent to which the distortion of said section would be perceptible to a human listener, and combining the results of each such comparison to generate an overall measure of the extent to which the distortion of the signal would be perceptible to a human listener.

The invention may be embodied in computer software, as a computer program product for loading directly into the internal memory of a digital computer, comprising software code portions for performing the steps of the method described above when said product is run on a computer.

In a further aspect the invention comprises a computer program product stored on a computer usable medium, comprising:

computer-readable program means for causing a computer to select individual sections in a first signal and in a second signal, computer-readable program means for causing the computer to analyse each section in the first signal and the second signal to generate a distortion perception measure which indicates the extent to which the distortion of said section in the second signal as compared with the first signal would be perceptible to a human listener, and computer-readable program means for causing the computer to combine the results of each such comparison to generate an overall measure of the extent to which the distortion of the signal would be perceptible to a human listener.

The computer program product may be embodied on any suitable carrier readable by a suitable computer input device, such as CD-ROM, optically readable marks, magnetic media, punched card, or on an electromagnetic or optical signal.

A preferred embodiment of the invention will now be described, by way of example, with reference to the drawings, in which.

The functional components illustrated in these figures can be embodied as software running on a general-purpose computer.

Figure 1:
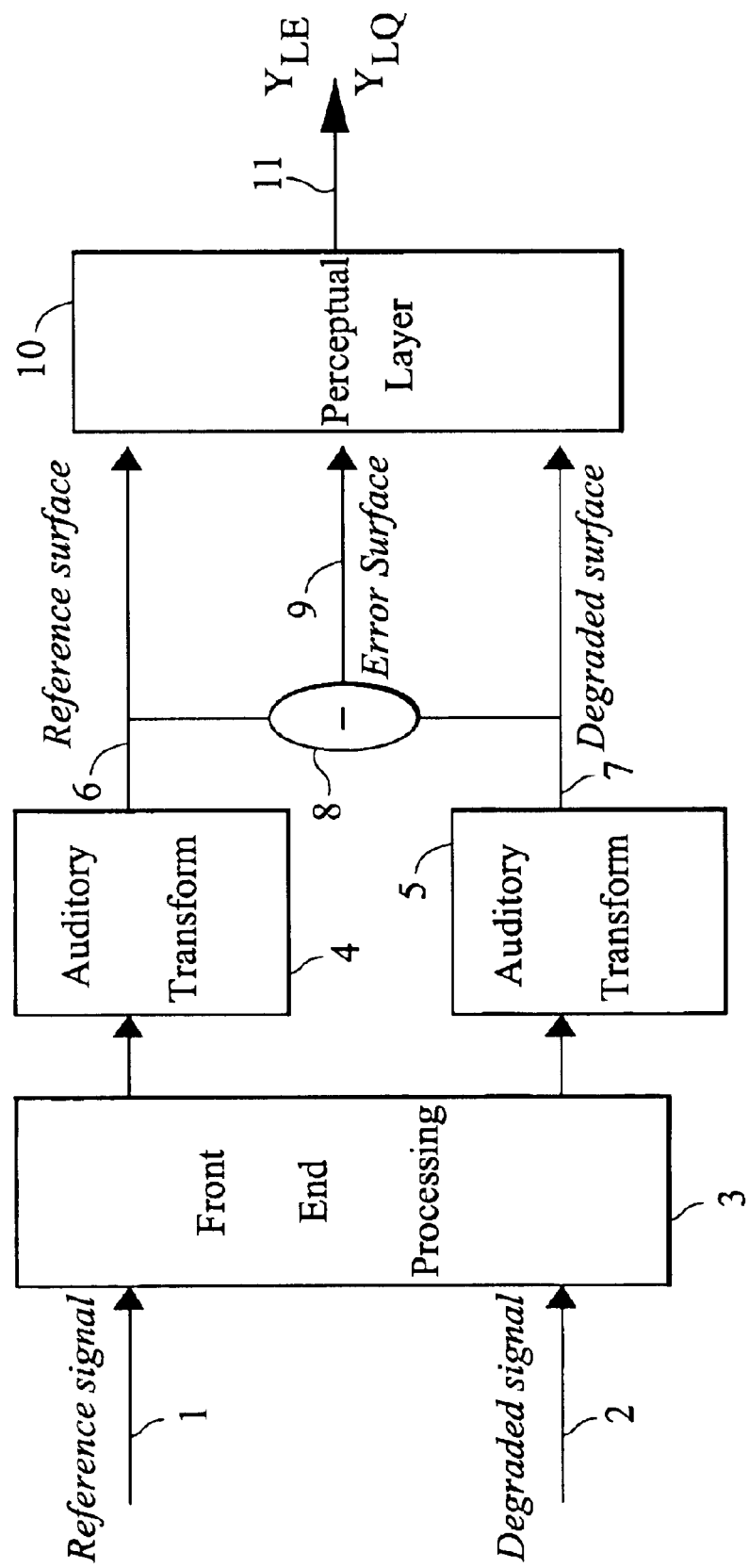
FIG. 1 shows, in diagrammatic form, the general arrangement of the prior art system.

The prior art system shown in FIG. 1 incorporates two inputs 1,2 for providing the reference signal and the degraded signal. These undergo preprocessing in a front end unit 3, primarily in order to synchronise the two signals, as will be described in more detail with reference to FIG. 3. They then undergo auditory transformation in a transform unit 4,5 to model the non-linear response of the human auditory system to frequency, and the frequency-dependent response of the auditory system to amplitude. These transforms will be described in more detail with reference to FIG.

4. They each generate a respective output 6,7, comprising a series of values representing the signal as a set of frequency bands and of time intervals, which can be represented as a two dimensional matrix, or graphically as a surface.

The frequency bands are of unequal width, to allow for the non-linear response of the human auditory system. The time intervals need not be the same in each auditory band, as discussed in European patent EP 0647375.

These two outputs 6,7 are compared by a comparator 8 which generates an output 9 which is a measure of the difference between them. This output 9 represents the audible error applied to the reference signal 1 by the system under test in order to generate the degraded signal 2. The three outputs 6,7,9 are then processed by a perceptual analysis unit 10 which determines the perceptual significance of each audible error identified on the output 9. This process takes into account contextual factors such as whether the error is masked by other frequency or time components, whether the error is of a type which affects comprehension, and other factors discussed in detail in the specifications referred to previously. Signals are then generated at the output 11, which give an overall value for listening effort ($Y_{LE}$)—a measure of how much a listener would need to concentrate to extract meaning from a signal carrying such distortions, and for listening quality ($Y_{LQ}$)—the subjective quality of the signal. Both scales rate the signal on a scale from 1 to 5 (larger numbers signifying less degradation), and are described in ITU-T P.800.

Figure 3:
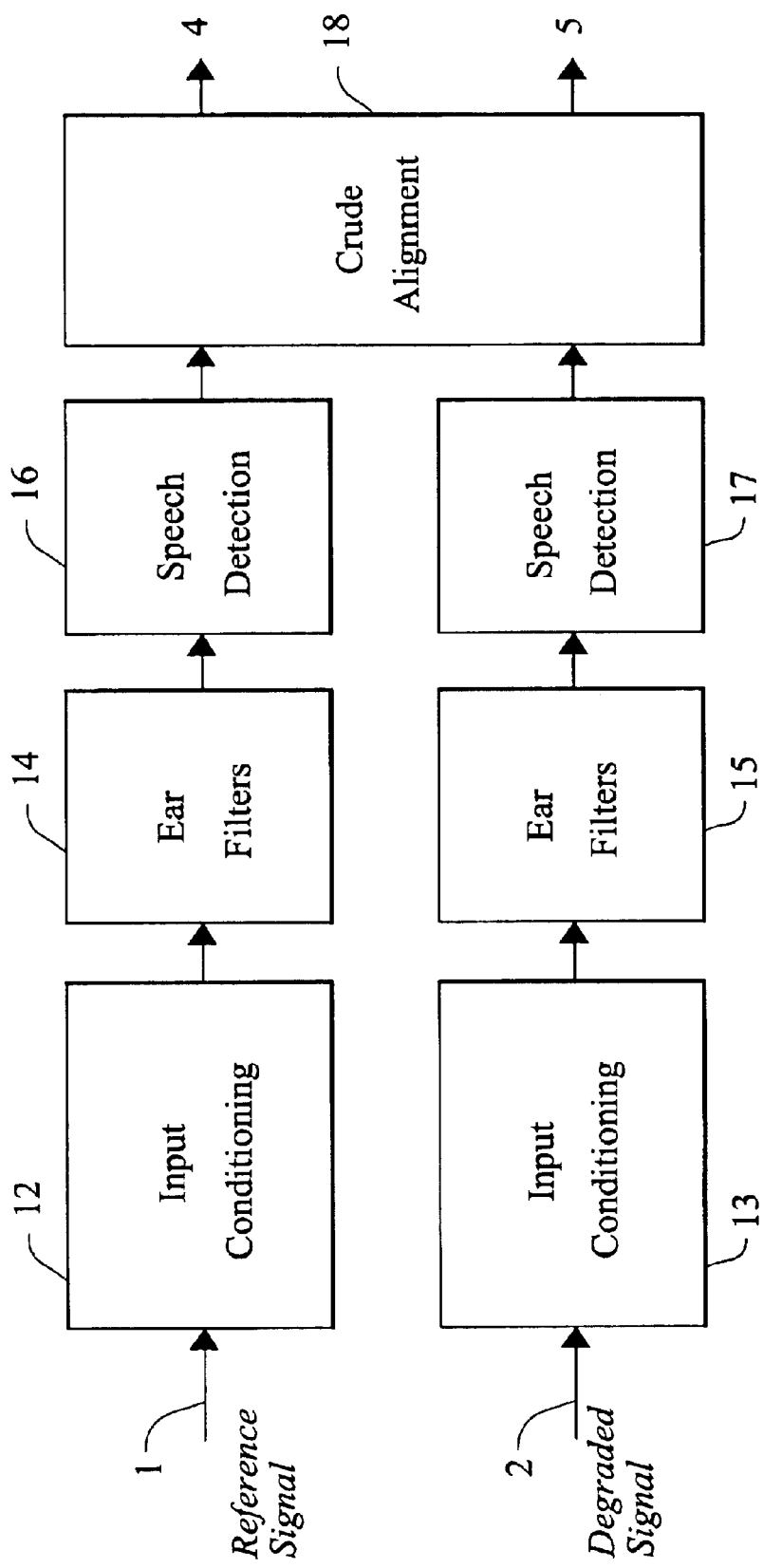
FIG. 3 shows, in more detail, the arrangement of the pre-processing elements of FIGS. 1 and 2.

FIG. 3 shows schematically the processes that take place in the front-end unit 3. Each signal is first subjected to input conditioning (units 12/13) to remove simple systematic differences such as DC level. The signals are then passed to filters 14/15, which emulate the frequency response between the point of signal acquisition and the inner ear. Each signal is then passed to a respective speech detection stage 16/17, to identify the onset of speech, or some other predetermined cue in the signal. This allows corresponding parts of the reference signal and degraded signal to be identified in an alignment processor 18 so that the two signals can be processed to generate an error surface. In the prior art system of FIG. 1, which is configured to assess the quality of switched connections in which delay is constant, this alignment is sufficient to synchronise the entire speech sample. However, in the present invention individual packets, and individual utterances assembled from those packets, are subject to variable delays around the value determined by the alignment processor 18. In general, the degraded signal will carry some degree of attenuation or amplification as compared with the original reference signal. Simple attenuation or amplification, if within the limits of audibility, will not affect the perceptual quality of the speech content, so such changes in level must be allowed for in the processing. The alignment processor 18 compares the absolute level of the two cue signals, so that attenuation can be compensated for in the comparison.

Figure 4:
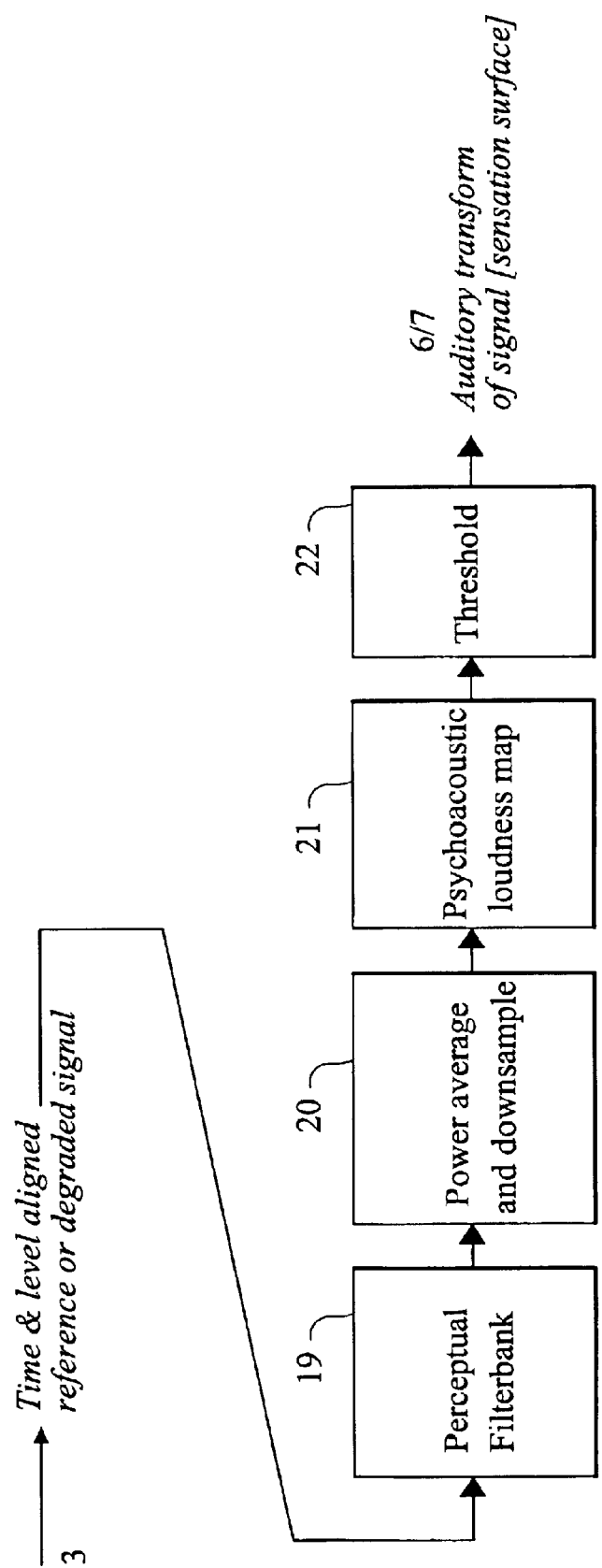
FIG. 4 shows, in more detail, the arrangement of the auditory transform elements of FIGS. 1 and 2.

FIG. 4 shows the functional elements of the auditory transform units 4,5. The signal is first filtered 19 into a number of separate frequency bands, each of which is then averaged (20) in the time domain over an interval. The interval may be different for different frequency bands, according to considerations such as the duration of masking effects, and the audibility of short-duration sounds, which effects vary with frequency. The psycho-acoustic loudness of each time and Lit frequency component, taking into account masking effects, frequency, and other psychological and physiological factors, is then determined (21). Values below an audibility threshold value are then eliminated (22) to generate the outputs 6,7.

The auditory transform units 4,5, and the components 12,13,14,15,16,17 of the front end processor 3 are shown as being duplicated, to allow the reference and degraded signals to be processed in parallel. It is possible to carry out these processes sequentially for the two signals, using a single input conditioning unit, filter and speech detector to process first the reference signal, and then carrying out the same process on the degraded signal. Both outputs are then applied to the alignment processor 18. Similarly, the two reference surfaces 6,7 may be generated by the same auditory transform unit. Clearly, the results of the first processing have to be stored whilst the second signal is processed.

Figure 2:
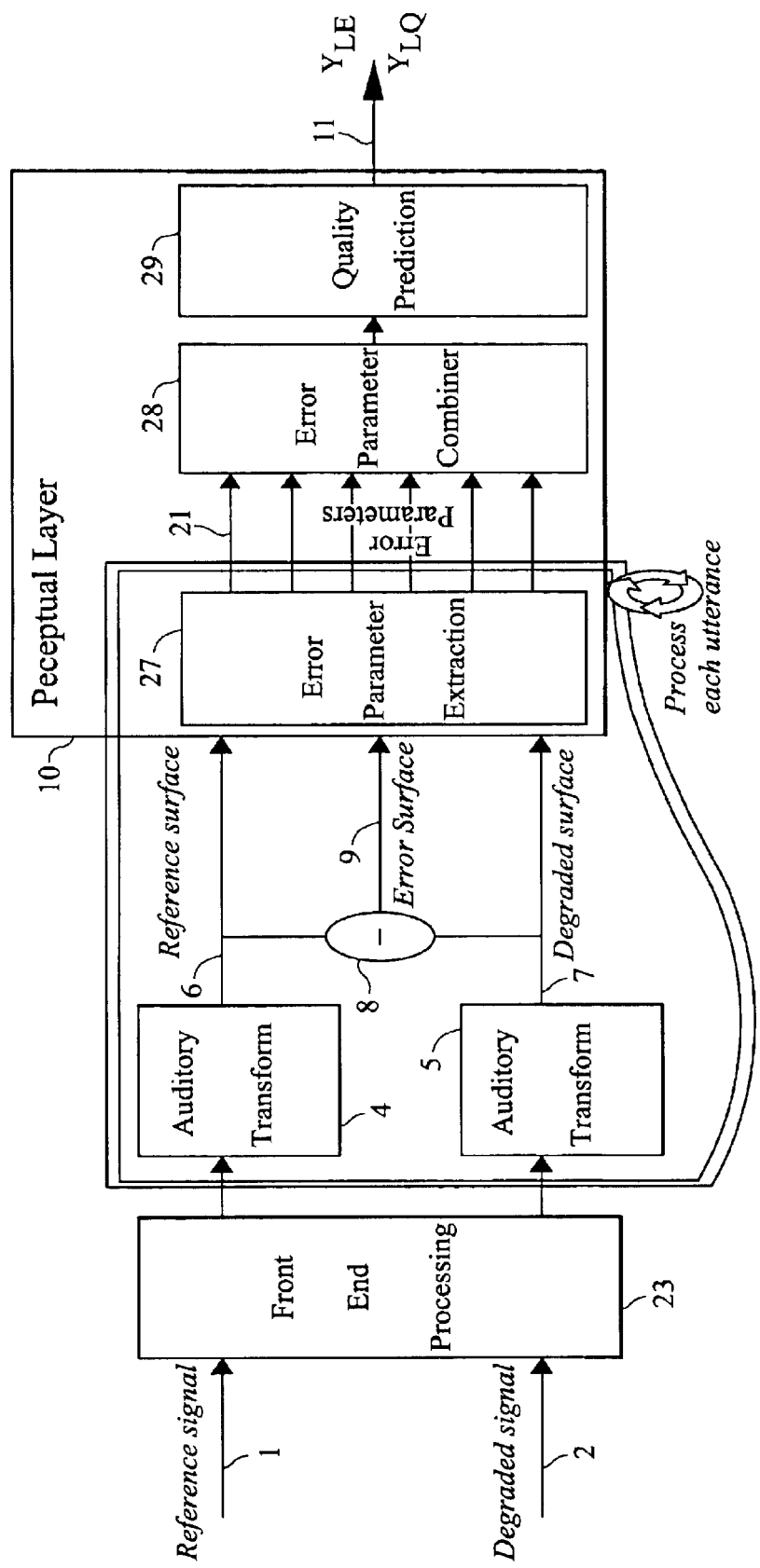
FIG. 2 shows, in diagrammatic form, the general arrangement of a system according to the invention.

In the prior art model speech and non-speech are identified in the speech detectors 16, 17, to select and align the complete samples for use in the perceptual analysis unit 10. In contrast, in the embodiment of the invention shown in FIG. 2, the perceptual analysis unit 10 operates on a single section at a time. In the invention, alignment, level and transfer function are estimated independently for each utterance. Multiple sections within a test signal are processed individually and their extracted parameters then combined.

The inputs 1,2 are applied to a front end processor 23, which carries out similar functions to the processor 3 in FIG. 1, but operates to select and align each individual section instead of simply aligning the signal as a whole. This will be described further, with reference to FIGS. 5 and 6. The processor 23 generates a series of aligned section pairs.

The auditory transform units 4,5 and error parameter extraction unit 27 then handle each section pair, in the same way as the prior art process, to generate error parameters for each utterance, at the output 21.

These error parameters are then further processed in a combiner unit 28, which generates, for each error parameter, an overall value aggregated over all the sections. These overall values are typically an aggregate or average value of the individual section parameters, weighted to take account of the relative perceptual significance of each section, for example its length. These weightings can be determined in advance, since the test signal is a predetermined reference signal. The error parameter combiner 28 ensures that errors occurring in different sections are appropriately aggregated. For example the length of a particular section would influence its impact on the quality. Also the combiner may include an error aggregation profile—errors occurring at the beginning or end of a call may have greater impact on perceived quality than those in the middle of the call.

Finally, the combined error parameter is converted to the standard ITU signal quality scale in a translation unit 29, to generate values of $Y_{LE}$ and $Y_{LQ}$ at the output 11.

Figure 5:
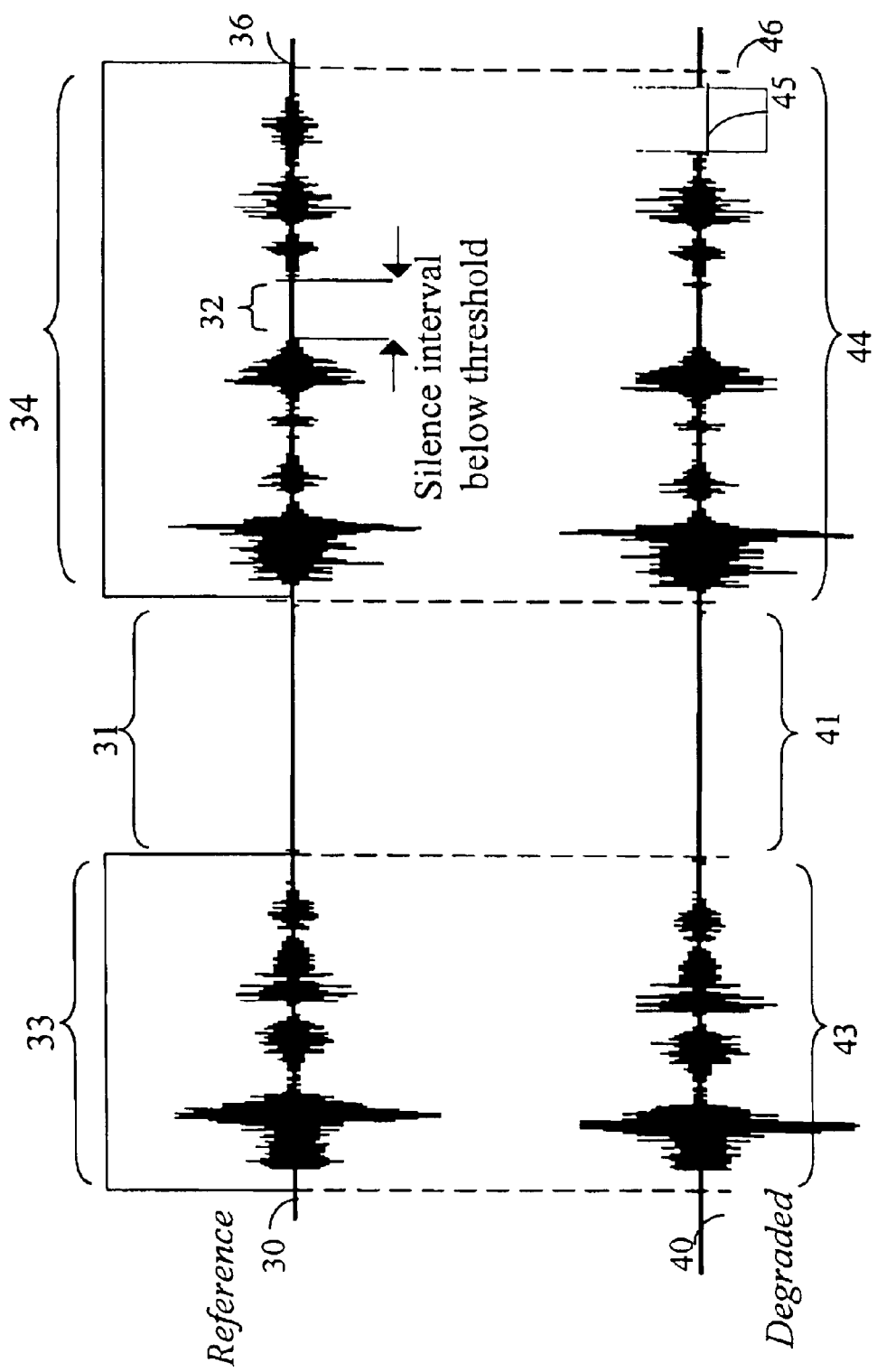
FIG. 5 illustrates the utterance identification process used in the preferred embodiment of the invention.

A process carried out in the front end processor 23 to select the sections for analysis will now be described in detail with reference to FIG. 5, which shows parts of a reference signal 30, and a degraded version 40 of that signal. In this process individual utterances are identified. An utterance is regarded as a period of speech in which an instance of non-speech does not exceed a defined threshold duration. As shown in FIG. 5, the reference signal has two periods of silence, 31, 32. The first period, 31, is longer than the threshold value and thus defines a gap between two utterances 33, 34. The second period, 32, is shorter than the threshold and thus does not define a gap between two utterances. Some voice-over-packet switching systems are arranged to ensure that each packet of a transmission must be routed the same way as the previous packet unless a predetermined number of preceding packets have all been silent. This ensures that all packets of any one utterance are routed the same way, although different utterances can be routed differently, the silent gaps being consequently shorter or longer at the receiving end. The threshold used in the present embodiment may conveniently be selected to correspond to this predetermined number of silent packets.

To maintain robustness the beginning and end marks for the utterances 43, 44 in the degraded signal are taken only from the reference signal 30. This ensures that audible interference on the degraded signal 40, or loss of the signal, does not interfere with the identification of the utterances. For example, in FIG. 5 the last part 45 of the second degraded utterance 44 has been lost, however the end 46 of the degraded utterance 40 is located at the point corresponding to the end 36 of the reference utterance 30.

Figure 6:
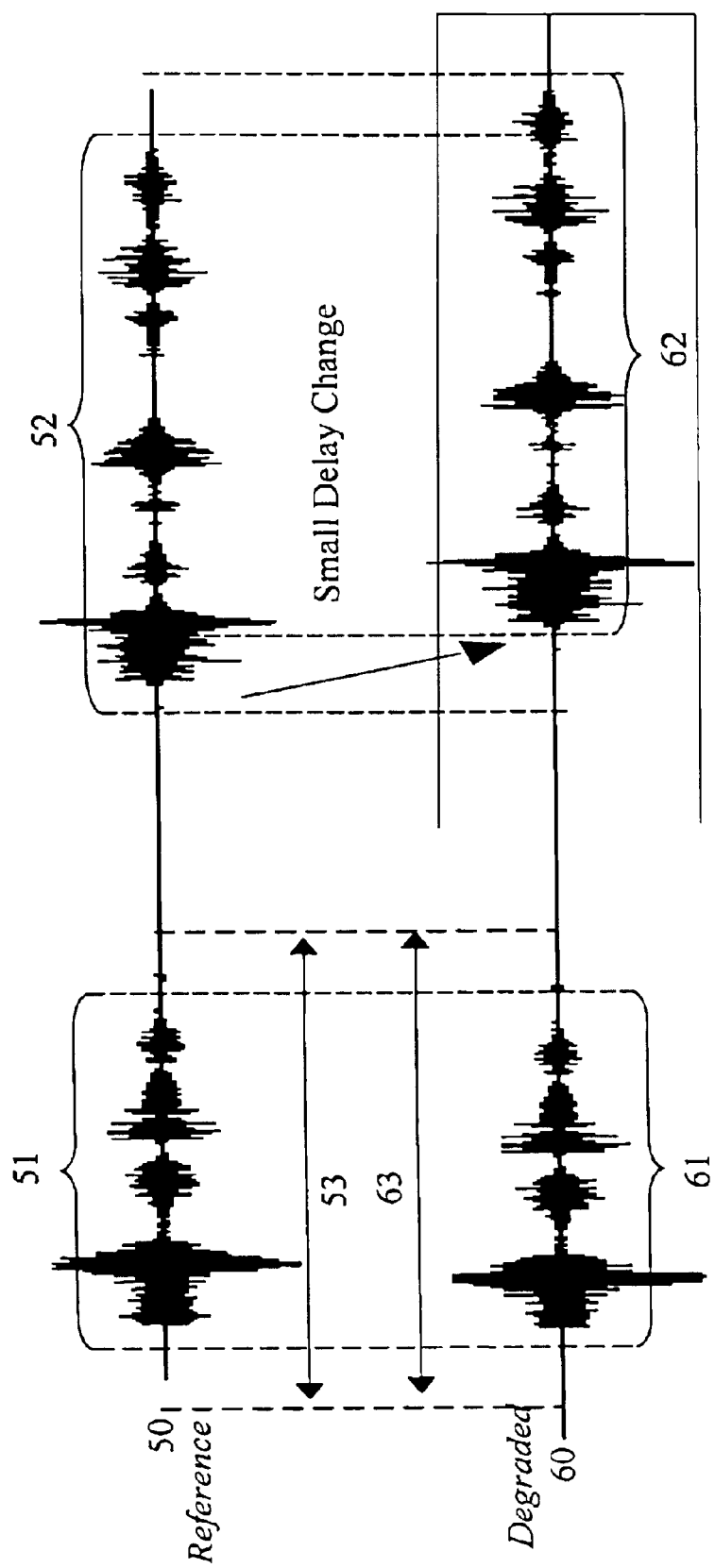
FIG. 6 illustrates the utterance alignment process used in the preferred embodiment of the invention.

The human brain is insensitive to small changes in delay or level between speech events. Processing utterance by utterance allows these small changes to be disregarded. FIG. 6 illustrates this process.

It is assumed that the front end processing module 3, (FIG. 3), has accounted for the bulk delay offset between the reference signal 50 and degraded signal 60. With the bulk offset removed each utterance 61, 62 in the degraded signal 60 is expected to be within an align-window of n samples either side of the corresponding reference utterance 51, 52. A portion of the reference utterance 51, herein referred to as an utterance search area 53, is processed by correlating it with the corresponding portion 63 of the degraded signal, using a cross-correlation method on overlapping parts. The method may be that used in the applicant's European Patent 0791251. The mode of the correlation function identifies the precise start point of the degraded utterance 61. As a result the degraded utterance 61 can be aligned with the reference utterance 51, allowing this portion to be processed through the rest of the analysis unit. The process is repeated for subsequent utterances 52, 62, etc.

Figure 7:
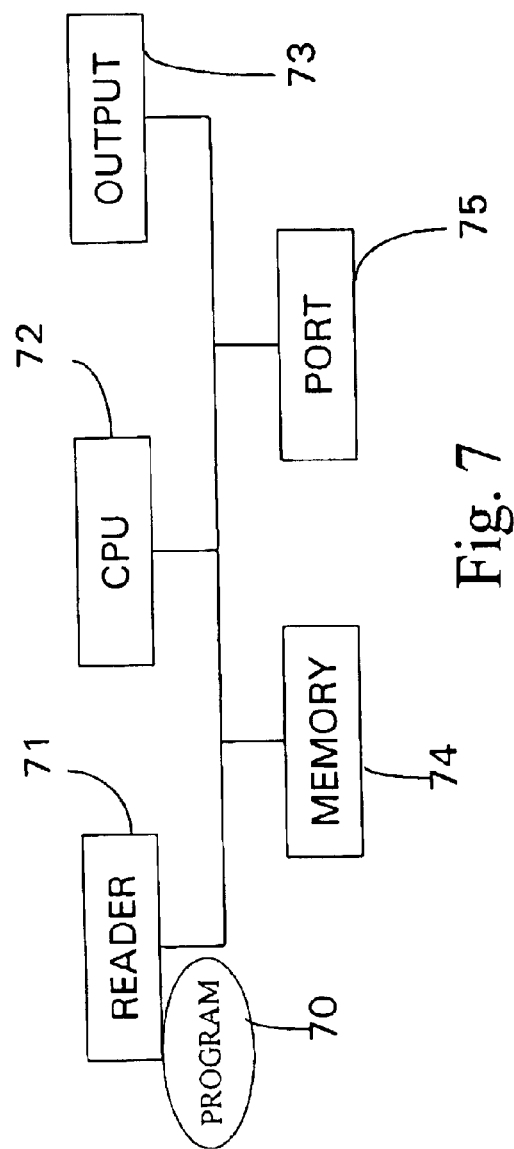
FIG. 7 illustrates the functional elements of a general-purpose computer suitable for performing the invention.

Level alignment, transfer function estimation, auditory transforms and error parameter extraction can then all be performed on an utterance by utterance approach. FIG. 7 illustrates schematically a general-purpose computer suitable for performing the invention. It comprises an input device 71, a central processing unit 72, an output device 73 such as a printer or visual display unit, a memory 74, and a port 75 for connection to other devices. The operating instructions for controlling the computer may be supplied in machine-readable form on a carrier such as a magnetic disc or tape 70, or a signal downloaded through the port 75 from another device by way of a telecommunications connection. Similarly, the reference signal and degraded signal may be supplied by either means. The operating instructions and the reference and degraded signals are stored in the memory 74 until called up by the central processor 72, which operates in accordance with the instructions carried in the program, and any human inputs made through an input device connected to the port 75. The output parameters, $Y_{LE}$ and $Y_{LQ}$ are supplied to the output device 73.

It will be noted that differences in delay within an individual utterance (speech event) may also occur. Differences in delay between one part of an utterance and another part of the same utterance are more noticeable than differences in delay between separate utterances, so they are more likely to affect the subjective quality of the signal and it is more important to account for them. In particular, a reduction of the delay between the original and degraded signal during an utterance will be apparent as the shortening of an individual sound, or its complete absence. Similarly, an increase in the delay between the original and degraded signal during an utterance will be apparent as the lengthening of an individual sound, or the introduction of a sound absent from the original signal. These errors have an effect on the perceived quality of the signal. However, the misalignment of the signals before or after the change in delay would also be perceived by the measuring system as degradation, even though no degradation would be detectable to the listener.

Figure 8:
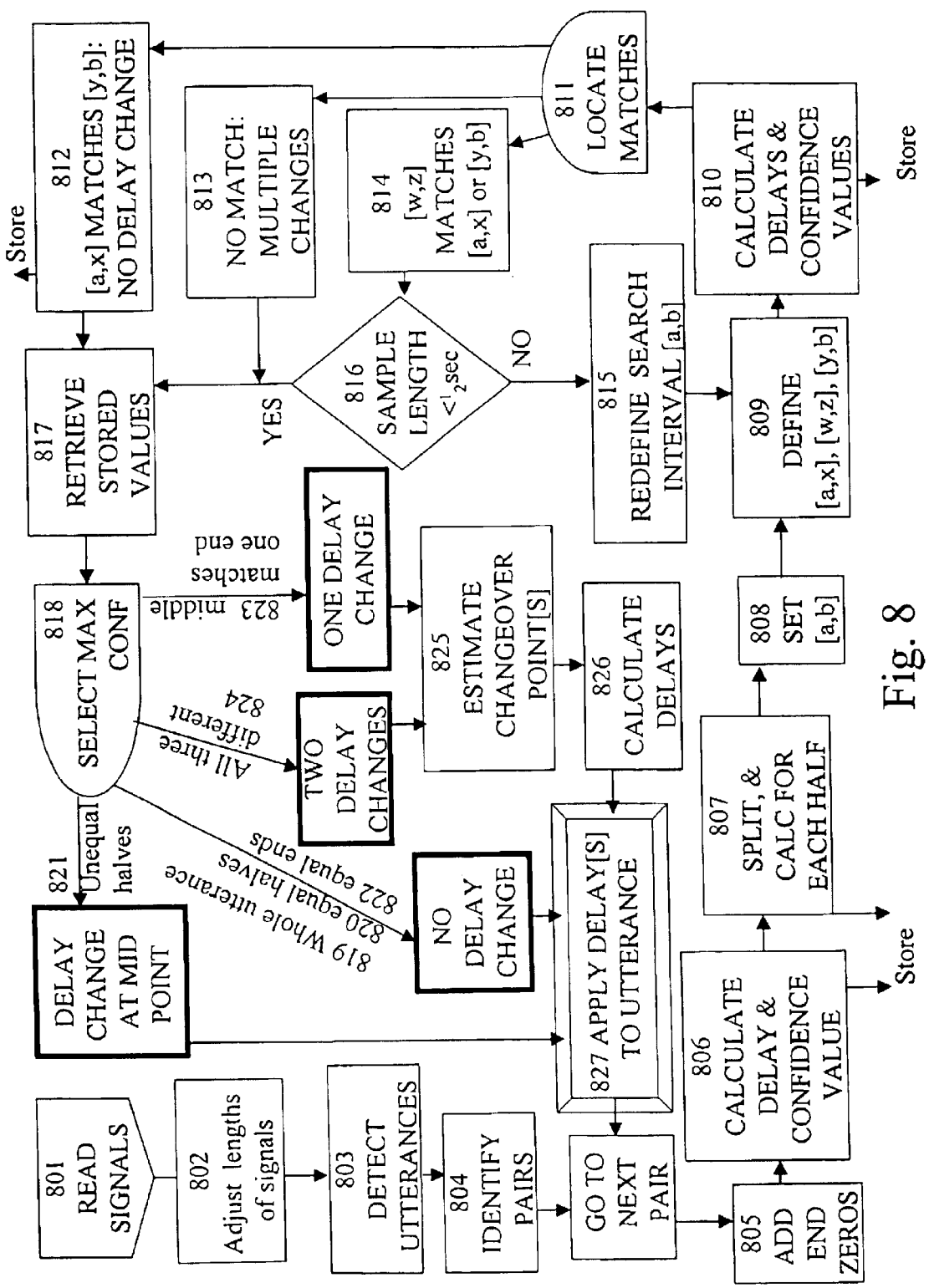
FIG. 8 illustrates a modified process according to the invention, allowing a single utterance to be aligned in two parts

In a modification of the invention, which will now be described with reference to FIGS. 8 and 9, such discontinuities in delay may be identified and allowed for. This process will identify an utterance with a single such discontinuity, unless it is close to the beginning or end of the utterance. It will also identify some utterances with two such discontinuities.

This process estimates for a given pair (original/degraded) of speech files any temporal delays present in the degraded file and the locations of any delay changes. The process is illustrated in FIGS. 8 and 9.

In an initial processing step the original signal 1 and degraded signal 2 are read (step 801). If the degraded signal is shorter than the original signal, zero padding is added to the end of the degraded signal (step 802). If the degraded signal is longer, its length is adjusted by truncating it. This ensures the integrity of the original signal is not affected.

Next, areas of speech activity (utterances) are located (step 803) using a voice activity detector; for each utterance from the original file the section with the same sample labels from the degraded file is identified (step 804). For each such utterance pair the following steps are then performed.

Since the voice activity detector produces cut-off points for the extracted speech sections directly where speech starts and ends, there is no run-in or run-out; a short period of silence is therefore added to each end of the two utterances in order to aid the alignment process (step 805).

The next step is to calculate a delay estimate for the complete utterance (step 806) and store the result. A confidence value for this delay estimate is also calculated and stored.

The utterance is next split into two sections at the midpoint m (see FIG. 9), and delays and confidence values for each half are calculated and stored (step 807).

If the delays in the two halves match (within a small error margin), this is indicative that the delay is constant throughout the utterance and there is no delay change. The following trisection procedure 808–826 is then used to produce a further confidence measure to confirm this result, using the delay value already determined (step 806). If the two delays do not match (within a small error margin), this is indicative that the second section has an average delay different from that in the first, indicating that a delay change is present in one of the two halves. The following trisection procedure 808–826 is used to determine the position of the delay change.

In this specification, two delay estimates are said to "match" if they differ by less than a predetermined tolerance, for example 16 digitisation samples (1 millisecond).

Note that delay changes very near the beginning or end of the utterance will not be detected, because the two halves will then have delay values that are very similar. In such circumstances the original and degraded utterances will be aligned correctly except for a short section at one end, which will be identified as a degradation.

Figure 9:
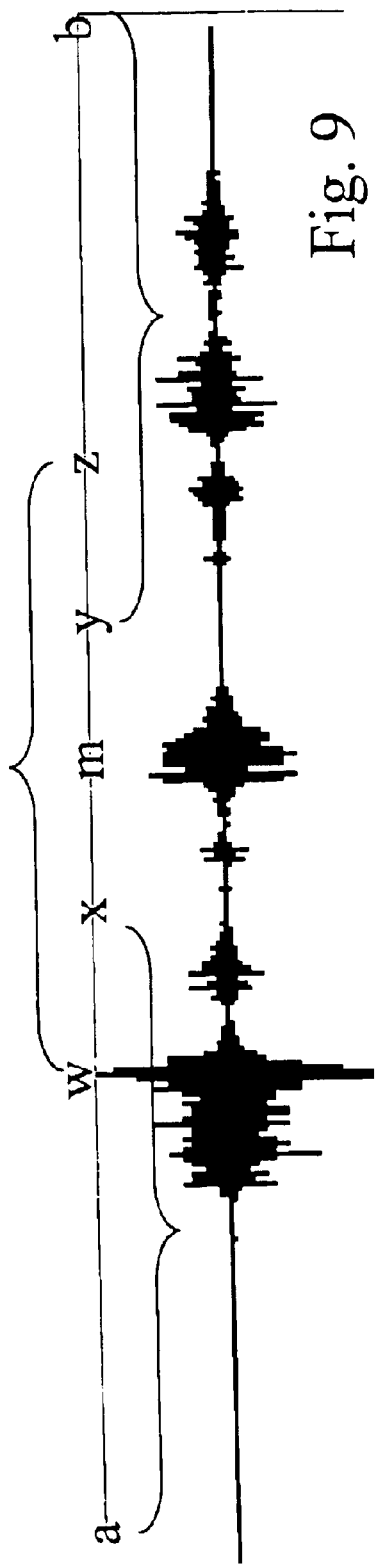
FIG. 9 is a time line illustrating the process shown in FIG. 8

The trisection procedure is an iterative process carried out on a search interval [a,b] which is initially the complete utterance (as shown in FIG. 9) but is re-defined on each iteration. The search interval is analysed in three symmetrical overlapping sections of equal length, as shown in FIG. 9, each of the three sections comprising 40% of the search interval. They are defined by the intervals: [a,x], [w,z], [y,b], where a, w, x, y, z, b are respectively at 0.0, 0.3, 0.4, 0.6, 0.7, and 1.0 fractional distances of the complete search interval [a,b]. As they form a symmetric set about the midpoint m (0.5 fractional distance from either end of the search interval), the search direction is unbiased.

To begin the iterative trisection process, the search interval [a,b] is set to be the entire sample (step 808).

At each step of the iterative process, the three overlapping intervals [a,x], [w,z] and [y,b] are defined as the first, middle, and last 40% of the search interval respectively (step 809). Delays and corresponding confidences are then measured and stored for each section (step 810).

It has already been noted that if a delay change occurs close to the beginning or end of a search interval, it will have a relatively small effect on the delay value estimate for that interval, and is unlikely to be detected as a delay change. Thus delay changes near the beginning or end of an utterance are less detectable than those nearer the middle. A delay change occurring for example in the region [w,x] (FIG. 9) will result in the delay value estimated for the first interval [a,x] being influenced mainly by the actual delay before the change, but the delay value estimated for the middle interval [w,z] will closely correspond with the actual delay after the change. This second delay value will also be measured, but with a greater confidence value, for the third interval [y,b]. Thus the delays for the second and third intervals [w,z] and [y,b] will match, in the sense defined above.

In the next stage, the delays measured for the three intervals are compared (step 811)

If the first and third intervals [a,x] and [y,b] match, the search is terminated and the iterative loop exited (step 812), as it is to be concluded in this case that there is no delay between the beginning and end of the search interval. The delay for the complete search interval, and a confidence value, are then estimated and stored, and the iterative loop exited (see step 816).

If none of the three intervals match (step 813), the search is terminated and the iterative loop exited (step 816) since in this case it is not possible to determine a direction for the next iteration. This situation will occur if two or more delay changes are present.

If the delay for the middle interval [w,z] matches one (but not both) of the other two [a,x], [y,b] (step 814), the delay change can be assumed to lie within or near the overlap between the second interval [w,z], and the non-matching interval [y,b] or [a,x]. The search interval is then redefined to become [a z] or [x,b] (step 815) (eliminating the interval within which the delay change does not occur) and another iteration is made (step 809).

The iterative procedure terminates when the length of the search interval decreases below a predetermined threshold, (for example 8000 samples: 0.5 sec), (step 816) unless the loop has already been exited (steps 812, 813).

The delay values and confidence values already stored (steps 806, 807, 810, 812) are now used to determine the changeover point and actual delay values.

Firstly, the stored confidence value for each iteration of the procedure, including the full utterance and half-section stages, are retrieved, and the mean confidence value for each iteration is determined (step 817). The set of delay values corresponding to the maximal mean confidence is then selected (step 818) as this will be the set in which the estimated position of the delay change (if any) is closest to the exact value.

To identify the bounds within which the actual changeover point falls, the following steps are performed on the selected set of delay values:

If the delay calculated for the whole utterance alignment (step 806) gives the delay with the largest confidence, it is inferred that there is no delay change and so no changeover point (step 819).

If the largest mean confidence value is identified as that obtained for the two delays calculated for division of the utterance into equal halves (step 807), and those halves match, then again there is no delay change and so no changeover point (step 820). If the halves do not match, then there is a delay change, the changeover point being identified as exactly the midpoint of the utterance (step 821).

If the set of data values selected as having the highest confidence value is that of one of the trisections, the following steps 822–826 are followed.

If the best confidence value is for an iteration in which the first and third sections match (as found in step 812) then it is assumed that there is an error in calculating the middle section delay, (which is harder to obtain an accurate delay estimate for, since there are no beginnings and ends of speech to align) and that no delay change has actually occurred. (Step 822) The alternative possibility, that two complementary delay changes have occurred at exactly the right time such that the outer intervals [a,x], [y,b] match, with a different delay in the middle section [w,z], is too unlikely to require consideration.

If the delay in the middle interval [w,z] of the selected trisection matches one (but not both) of the other two intervals (as found in step 814), there must be a delay change within the search interval [a,b] (step 823). In particular, if the delay estimates match for the first and second intervals [a,x], [w,z], then the delay change must lie within the second half of the second interval [w,z], or the first half of the third interval [y,b]. Similarly, if the delay estimates match for the second and third intervals [w,z], [y,b] then the delay change must lie within the second half of the first interval [a,x], or the first half of the second interval [w,z]. The exact position of the changeover cannot be determined more precisely than the minimum search interval allows, so a predetermined point falling within the identified range of the selected search interval is selected as the estimated delay change position (step 825). (Note that the selected search interval itself is typically a small fraction of the complete utterance, as a result of the iterative reductions in the search interval (step 815), so the location of the delay change will be identified as falling within that short interval).

If no sections match (step 824), it is assumed that there are two delay changes (more than two are highly unlikely, and two predetermined points along the search interval are selected as the estimated delay change positions (step 825).

New values for the delay in each part of the utterance, as now defined by the estimated delay change point or points, are then determined (step 826).

Depending on the outcome of the selection step 818, the utterance may therefore have no, one or two delay changes identified. The original utterance pair 1,2 is then separated into separate sections at these delay changes (if any) and the delays so identified imposed on each pair (step 827).

The process (steps 805–827) is repeated for the next utterance pair.

In the embodiment described so far, the section initially selected is an individual utterance. Utterances of duration longer than some pre-determined threshold may be subdivided into two or more sub-utterances, each sub-utterance then being aligned separately, thereby allowing a plurality of delay changes to be identified in a single utterance.

The presence of a delay change may be tested by dividing the utterance in two at one or more different points. For each division point, the two parts of the signal are aligned separately and the confidence of such alignments is determined. A comparison across all division points of the delays of each part and the confidence of these delay values is used to determine the location, if any, of a delay change in the signal. This process may then be repeated for the sections on either side of this identified delay change to identify possible additional variations in delay.

In another alternative arrangement, the complete signal (or each of several predetermined sections of it such as individual utterances) is first processed as a whole to identify and cancel any constant delay. The signal is then divided in two and alignment performed on each section separately. Each section so aligned is recursively sub-divided until some pre-determined minimum duration is reached. This process enables a number of delay changes at arbitrary locations in the signal to be identified.

What is claimed is:

1. Apparatus for testing equipment for handling speech signals having a variable delay, comprising:
   means for receiving a first signal and for receiving a second signal corresponding to the first signal as distorted by the equipment under test and having a corresponding information content to the first signal but also having a delay in relation to the first signal which varies from one part of the signal to another,
   means for selecting individual sections of the first signal,
   means for selecting individual sections of the second signal having a corresponding information content to the selected sections of the first signal,
   means for comparing each of the selected sections of the first signal with the corresponding sections of the second signal to generate a distortion perception measure which indicates the extent to which the distortion of each section would be perceptible to a human listener, and
   means for combining the results of each such measurement, to generate an overall measure of the extent to which the distortion of the second signal with respect to the first signal would be perceptible to a human listener.

2. Apparatus according to claim 1, wherein the combining means derives an overall measure, which takes account of the perceptual importance of each section.

3. Apparatus according to claim 1, wherein the means for selecting individual sections in the signals comprises means for detecting the end of each silent period exceeding a predetermined length, thereby detecting individual utterances in the signal.

4. Apparatus according to claim 3, wherein an utterance containing more than a pre-determined length of speech is sub-divided into two or more sections.

5. Apparatus according to claim 1, wherein the means for selecting individual sections in the signals comprises means for detecting whether speech is present in each of a number of arbitrarily chosen sub-divisions of the signal.

6. Apparatus according to claim 1, wherein the means for analysing each section includes means for synchronising the section in the second signal with the corresponding section in the first signal.

7. Apparatus according to claim 6, wherein the synchronising means includes means for identifying the position of one or more delay changes within a section, means for separately synchronising the parts of the section preceding and following each delay change, and means for separately analysing the said parts of the section for distortion.

8. Method of testing equipment for handling speech signals having a variable delay, comprising the steps of:
   supplying a test signal,
   receiving a distorted signal which corresponds to said test signal when distorted by equipment under test and having a delay in relation to the test signal which varies from one part of the signal to another,
   selecting individual sections of the test signal and individual sections of the distorted signal having the same data content as the selected sections of the test signal, comparing each section of the distorted signal with the corresponding section of the test signal to generate a distortion perception measure which indicates the extent to which the distortion of each section would be perceptible to a human listener, and
   combining the results of each such comparison to generate an overall measure of the extent to which the distortion of the signal would be perceptible to a human listener.

9. Method according to claim 8, wherein the combining step derives an overall measure which takes account of the perceptual importance of each section.

10. Method according to claim 8 wherein the sections selected are individual utterances, identified by detecting the end of each silent period exceeding a predetermined length.

11. Method according to claim 10, wherein utterances containing more than a pre-determined length of speech are sub-divided into two or more sections.

12. Method according to claim 8, wherein individual sections in the signals are selected by detecting whether speech is present in each of a number of arbitrarily chosen sub-divisions of the signal.

13. Method according to claim 8, wherein the analysis of each section includes the step of synchronising the section in the distorted signal with the corresponding section in the test signal.

14. Method according to claim 13, wherein the section is analysed to identify the position of any delay change, and the parts of the section preceding and following any such delay change are separately synchronised and analysed for degradation.

15. A computer program for performing the steps of claim 8.

16. A computer program product directly loadable into the internal memory of a computer, comprising software code portions for performing the steps of claim 8 when said product is run on a computer.

17. A computer program product stored on a computer usable medium, comprising:
   computer-readable program means for causing a computer to select individual sections of a first signal and to select individual sections of a second signal corresponding to the first signal as distorted by equipment under test and having a corresponding information content to the first signal but also having a delay in relation to the first signal which varies from one part of the signal to another, each selected section of the second signal having information content corresponding to one of the selected sections of the first signal,
   computer-readable program means for causing the computer to analyze each selected section of the first signal and the corresponding section of the second signal to generate a distortion perception measure which indicates the extent to which the distortion of each section of the second signal as compared with the first signal would be perceptible to a human listener, and computer-readable program means for causing the computer to combine the results of each such comparison to generate an overall measure of the extent to which the distortion of the second signal would be perceptible to a human listener.

18. An apparatus for testing equipment that handles speech signals which are packetized during transmission through a telecommunications network comprising:
   a receiver for receiving a first speech signal and for receiving a second speech signal corresponding to the first signal as distorted by the equipment under test and having a corresponding information content to the first speech signal but also having a delay with respect to the first speech signal which varies from one part of the signal to another,
   a processing circuit for selecting individual sections of the first speech signal, and for selecting individual sections of the second speech signal, wherein the selected sections of the second speech signal have a corresponding information content to the selected sections of the first speech signal,
   a comparator for comparing each of the selected sections of the first signal with the corresponding sections of the second signal to generate a distortion perception measure which indicates the extent to which the distortion of each section would be perceptible to a human listener, and
   a combiner for combining the distortion perception measure results generated by the comparator to generate an overall measure of the extent to which the distortion of the second speech signal with respect to the first speech signal would be perceptible to a human listener.

19. Apparatus according to claim 18, wherein the combiner derives an overall measure, which takes account of the perceptual importance of each section.

20. Apparatus according to claim 18, wherein the processing circuit comprises a detector for detecting the end of each silent period exceeding a predetermined length, thereby detecting individual utterances in the signal.

21. Apparatus according to claim 20, wherein an utterance containing more than a pre-determined length of speech is sub-divided into two or more sections.

22. Apparatus according to claim 18, wherein the processing circuit comprises a detector for detecting whether speech is present in each of a number of arbitrarily chosen sub-divisions of the signal.

23. Apparatus according to claim 18, wherein the comparator includes a synchronizer for synchronizing one of the selected sections of the second signal with the corresponding section of the first signal.

24. Apparatus according to claim 23, wherein the synchronizer identifies the position of one or more delay changes within a section, separately synchronizes the parts of the section preceding and following each delay change, and separately analyzes the said parts of the section for distortion.

* * * * *